US012275258B2

(12) United States Patent
Tai et al.

(10) Patent No.: US 12,275,258 B2
(45) Date of Patent: Apr. 15, 2025

(54) PRINTING DEVICE AND RIBBON INSTALLATION MECHANISM THEREOF

(71) Applicant: GODEX INTERNATIONAL CO., LTD, New Taipei (TW)

(72) Inventors: Feng-Yi Tai, New Taipei (TW); Ching-Yang Chou, New Taipei (TW); Che-Fu Hsu, New Taipei (TW); Chun-Chang Tu, New Taipei (TW)

(73) Assignee: GODEX INTERNATIONAL CO., LTD, New Taipei (TW)

( * ) Notice: Subject to any disclaimer, the term of this patent is extended or adjusted under 35 U.S.C. 154(b) by 144 days.

(21) Appl. No.: 18/324,976

(22) Filed: May 28, 2023

(65) Prior Publication Data

US 2024/0391263 A1 Nov. 28, 2024

(51) Int. Cl.
*B41J 33/22* (2006.01)
*B41J 33/12* (2006.01)
*B41J 33/26* (2006.01)

(52) U.S. Cl.
CPC ............... *B41J 33/22* (2013.01); *B41J 33/12* (2013.01); *B41J 33/26* (2013.01)

(58) Field of Classification Search
CPC . B41J 11/04; B41J 15/044; B41J 31/12; B41J 32/00; B41J 33/12; B41J 33/16; B41J 33/22; B41J 33/26; B41J 33/36
See application file for complete search history.

(56) References Cited

U.S. PATENT DOCUMENTS

2019/0232691 A1* 8/2019 Chen ........................ B41J 33/40

FOREIGN PATENT DOCUMENTS

CN 116872631 A * 10/2023
JP 60021289 A * 2/1985
JP 2019059223 A * 4/2019 ............ G01M 3/002

* cited by examiner

*Primary Examiner* — Christopher E Mahoney
*Assistant Examiner* — Marissa Ferguson-Samreth
(74) *Attorney, Agent, or Firm* — Roger Chen

(57) ABSTRACT

A printing device and the ribbon mounting mechanism thereof are disclosed. The ribbon mounting mechanism is used for mounting a first ribbon comprising a first core and a second ribbon comprising a second core having a diameter smaller than that of the first core. The ribbon mounting mechanism includes a first shaft supporting the first core of the first ribbon; a second shaft supporting the second core of the second ribbon, wherein the second shaft and the first shaft are concentrically disposed; a torque generator comprising a third shaft; a first gear set connecting the first shaft and the third shaft, and torque generated by the torque generator is transmitted to the first shaft through the first gear set; and a second gear set connecting the second shaft and the third shaft, and torque generated by the torque generator is transmitted to the second shaft through the second gear set.

10 Claims, 15 Drawing Sheets

PRINTING DEVICE AND RIBBON INSTALLATION MECHANISM THEREOF

BACKGROUND OF THE INVENTION

Field of the Invention

The invention relates to a printing device and a ribbon mounting mechanism thereof, and more particularly to a printing device and a ribbon mounting mechanism for mounting ribbon roll having cores of different sizes without manual adjustment.

Description of the Related Art

Thermal printing is a technology which using a printing head enabling carbon printing material of a ribbon as a printing material be printed onto paper by pressure or heat. The thermal printing technology has currently been used for printing bar code or text. The core of the currently used ribbon has two sizes, 0.5 inch and 1.0 inch. The conventional printing device of thermal printing technology can be adapted to the ribbon having only one sized core. Another conventional printing device of thermal printing technology can be adapted to the ribbons having both sized cores, but the ribbon tension force must be adjusted manually by the user. Therefore, the two conventional printing devices of thermal printing technology both causes inconvenience for the users.

BRIEF SUMMARY OF THE INVENTION

An object of the invention is to provide a printing device and a ribbon mounting mechanism can adapt to the ribbon having different sized cores, and solve the problem of the conventional printing device of thermal printing technology which cannot be adapted to the ribbons having differently sized cores or must be adjusted manually to alter the ribbon tension force.

The invention provides a ribbon mounting mechanism. The ribbon mounting mechanism in accordance with an exemplary embodiment of the invention for mounting a first ribbon including a first core and a second ribbon including a second core having a diameter smaller than that of the first core, includes: a first shaft supporting the first core of the first ribbon; a second shaft supporting the second core of the second ribbon, wherein the second shaft and the first shaft are concentrically disposed; a torque generator including a third shaft; a first gear set connecting the first shaft and the third shaft, and torque generated by the torque generator is transmitted to the first shaft through the first gear set; and a second gear set connecting the second shaft and the third shaft, and torque generated by the torque generator is transmitted to the second shaft through the second gear set.

In another exemplary embodiment, the first gear set includes a first gear joined to the first shaft; and a second gear joined to the third shaft and engaging the first gear.

In yet another exemplary embodiment, the second gear set includes a third gear joined to the second shaft; and a fourth gear joined to the third shaft and engaging the third gear; wherein the third gear has a diameter and teeth number greater than that of the first gear; wherein the second gear has a diameter and teeth number greater than that of the fourth gear.

In another exemplary embodiment, the second gear set includes a third gear integrated to the second shaft; and a fourth shaft; a fourth gear joined to the fourth shaft and engaging the first gear and the third gear; wherein the third gear has a diameter and teeth number greater than that of the fourth gear; wherein the third gear has a diameter and teeth number greater than that of the first gear; wherein the second gear has a diameter and teeth number greater than that of the fourth gear.

In yet another exemplary embodiment, the fourth gear includes a first teeth portion engaging the first gear and a second portion engaging the third gear, the first gear portion has a diameter and teeth number greater than that of the second gear portion.

In another exemplary embodiment, the first shaft, the second shaft and the third shaft are parallel.

In yet another exemplary embodiment, the torque generator includes an elastic member, a first pressing plate and a second pressing plate, the second pressing plate and the third shaft are rotated simultaneously, the elastic member props against the first pressing plate, whereby the first pressing plate presses the second pressing plate.

In another exemplary embodiment, the second shaft surrounds an outer periphery surface, the first shaft has a first supporting portion, the second shaft has a second supporting portion having a diameter greater than that of the first supporting portion, and the first supporting portion and the second support portion are unaligned.

In yet another exemplary embodiment, the first shaft has a support portion disposed on the outer periphery surface thereof, and the support portion supports the second support portion.

The invention provides a printing device. The printing device in accordance with an exemplary embodiment of the invention the aforementioned ribbon mounting mechanism on which a ribbon supply roll is mounted; a retrieving shaft on which a retrieving ribbon roll is mounted; a tension roller pressing on a ribbon to generate a tension force on the ribbon, whereby the ribbon is driven from the supply ribbon roll to the retrieving ribbon roll; and a printing head enabling carbon material of the ribbon onto a printing medium.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
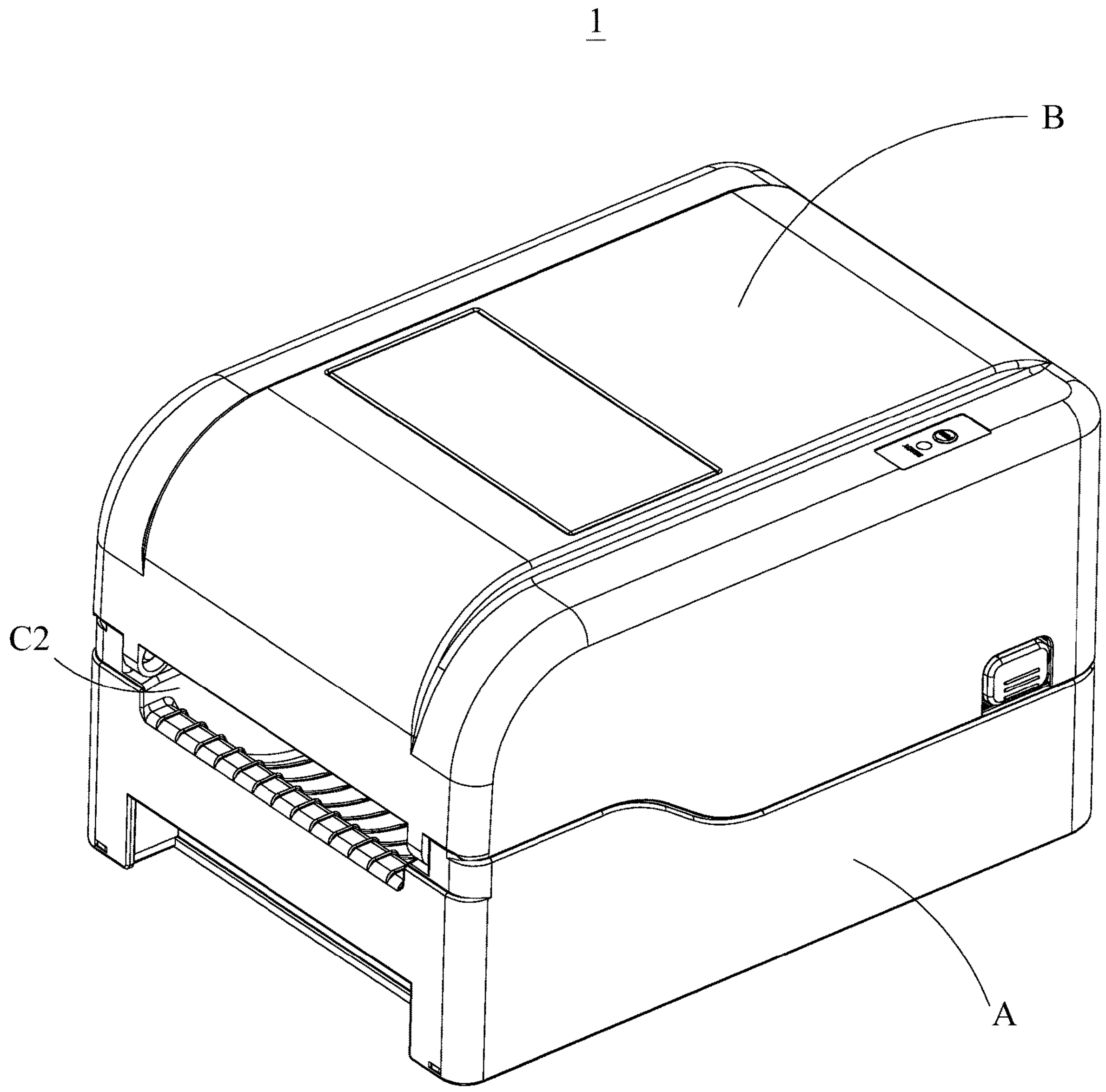
FIG. 1 is a perspective view of an embodiment of a printing device of the present invention.
Figure 2:
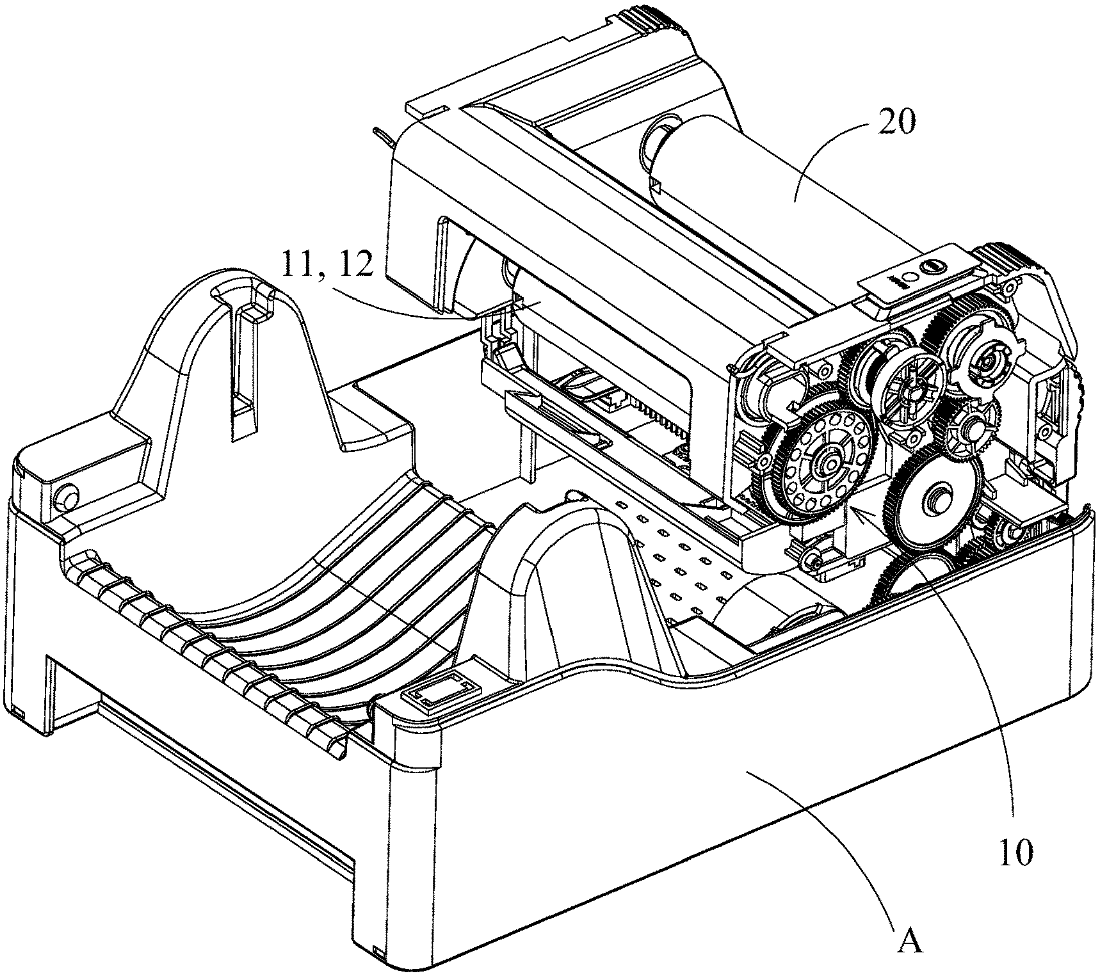
FIG. 2 is a perspective view of the printing device of FIG. 1, wherein an upper cover is removed.
Figure 3:
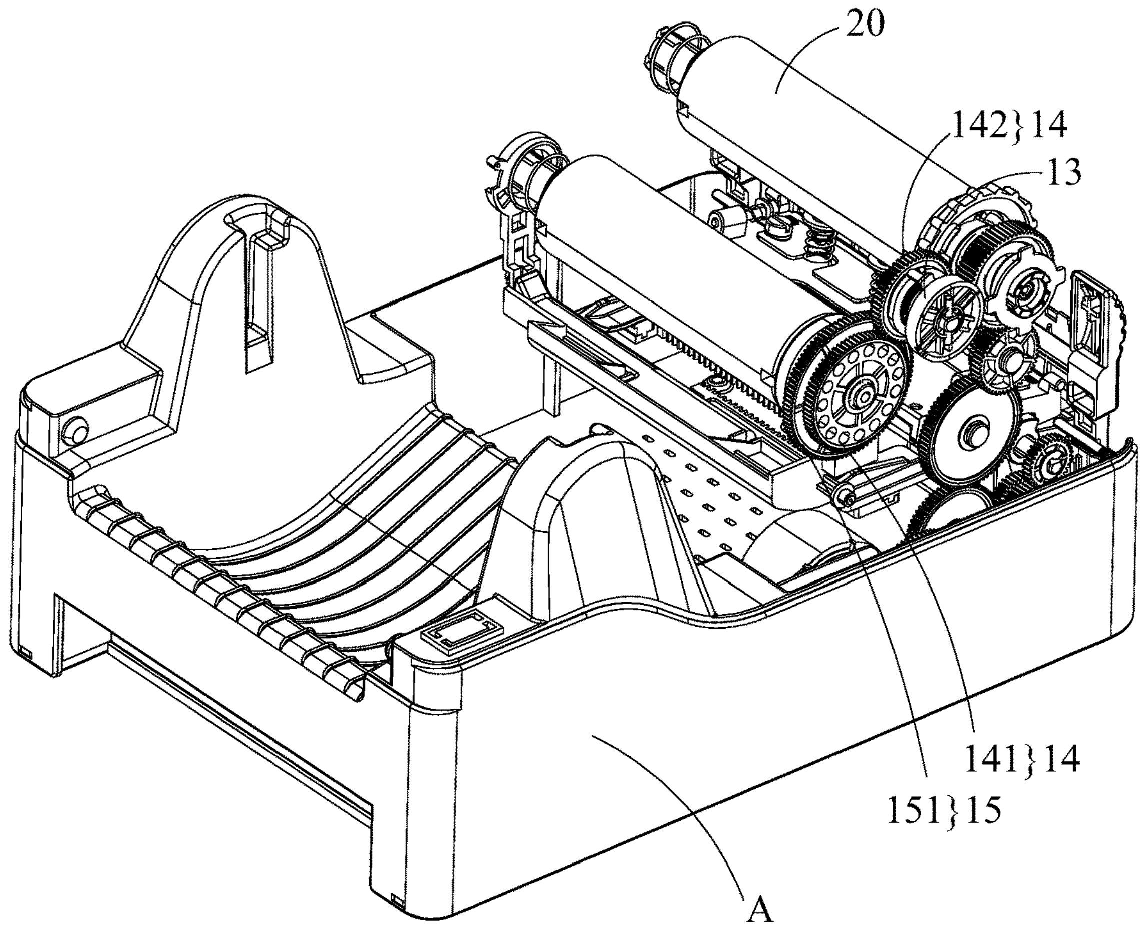
FIG. 3 is a perspective view of the printing device of FIG. 2, wherein a supporting frame is removed.
Figure 4:
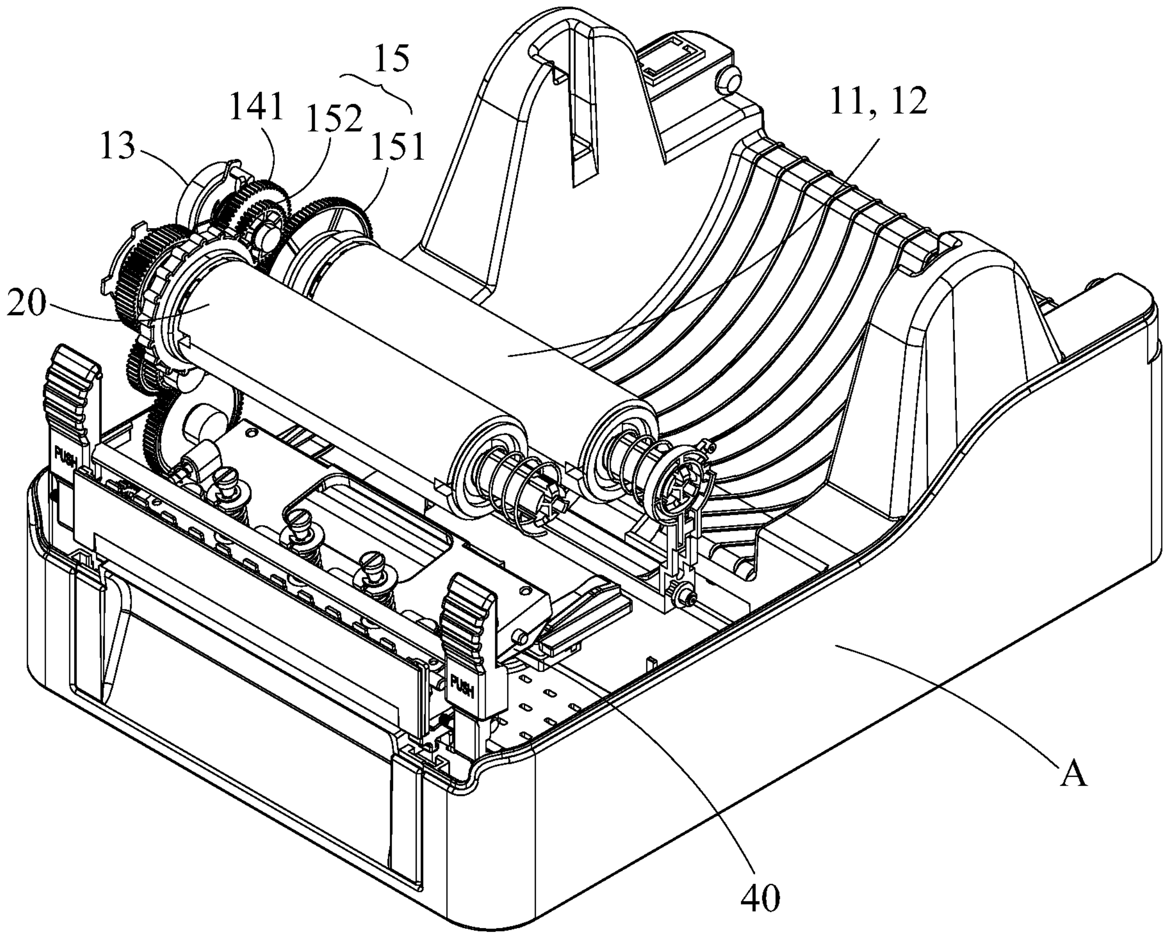
FIG. 4 is a perspective view of the printing device of FIG. 3 at another view angle.

The following description is of the best-contemplated mode of carrying out the invention. This description is made for the purpose of illustrating the general principles of the invention and should not be taken in a limiting sense. The scope of the invention is best determined by reference to the appended claims.

Referring to FIGS. 1, 2, 3, 4, 7 and 10, an embodiment of a printing device of the invention is presented. The printing device 1 of the present embodiment includes a base A and an upper cover B. The printing device 1 of the present embodiment further includes a ribbon mounting mechanism 10, a retrieving shaft 20, a tension roller 30 and a printing head 40. A ribbon supply roll R1 is mounted on the ribbon mounting mechanism 10, and a ribbon retrieving roll R2 is mounted on the retrieving shaft 20. A ribbon R extends from the ribbon supply roll R1 to the ribbon retrieving roll R2. The tension roller 30 presses the ribbon R and drives the ribbon R to move from the ribbon supply roll R1 to the ribbon retrieving roll R2. The printing head 40 moves the carbon material on the ribbon R onto paper.

The ribbon mounting mechanism 10, the retrieving shaft 20, the tension roller 30 and the printing head 40 are mounted on the base A, and the upper cover B is mounted on the base A and covers the ribbon mounting mechanism 10, the retrieving shaft 20, the tension roller 30 and the printing head 40 mounted on the base A. A printing medium inlet C1 and a printing medium outlet C2 are disposed between the base A and the upper cover B, and disposed on two opposite sides of the printing device 1, wherein the printing medium inlet C1 is closer to the printing head 40.

Figure 5:
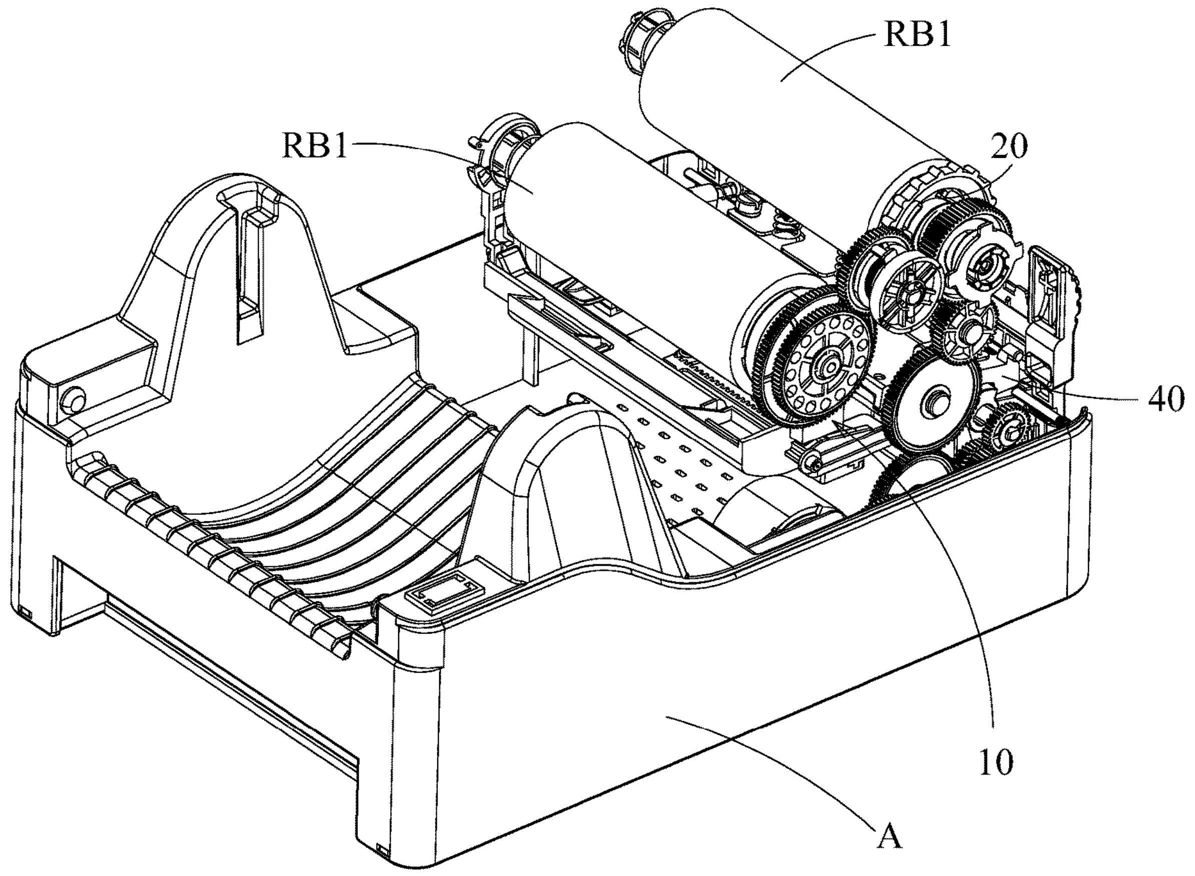
FIG. 5 is a perspective view of the printing device of FIG. 3, wherein a first ribbon is mounted thereon.
Figure 6:
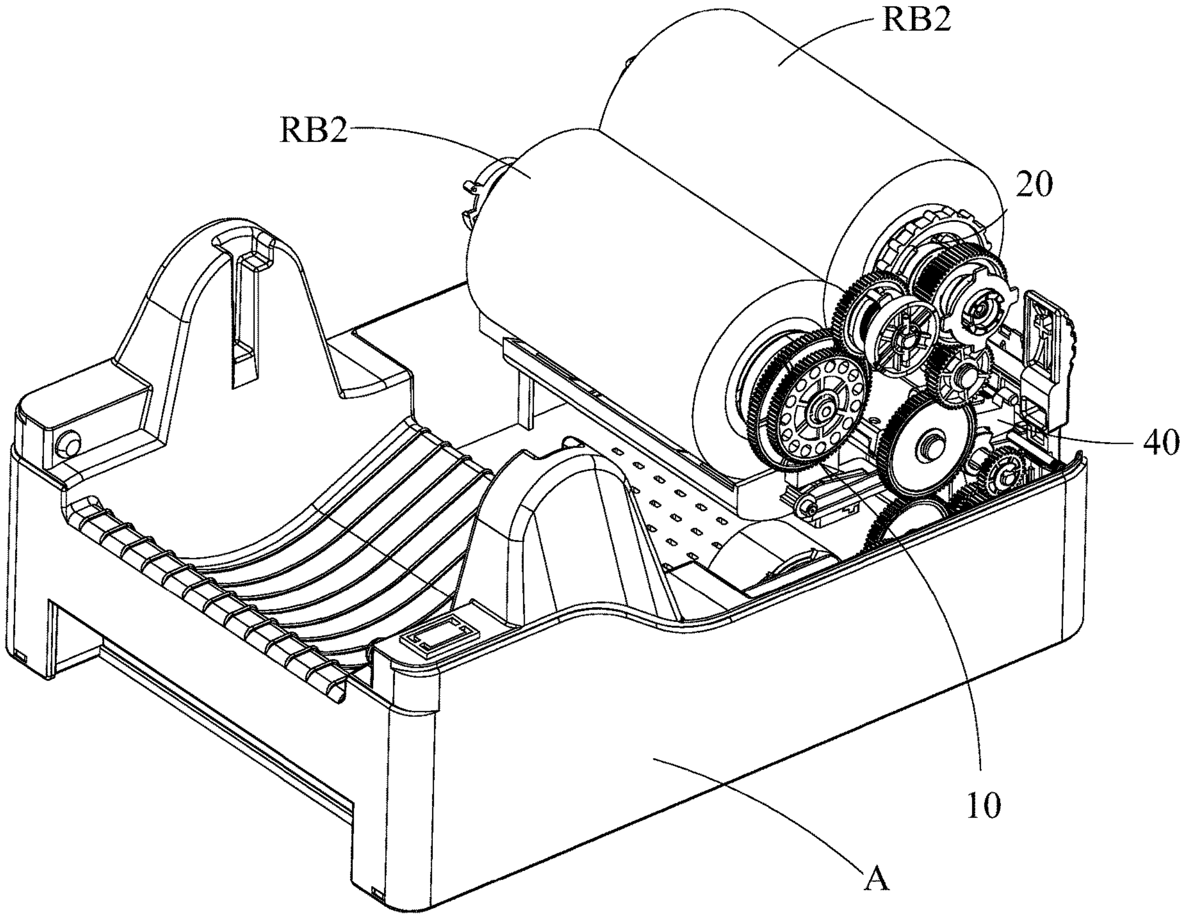
FIG. 6 is a perspective view of the printing device of FIG. 3, wherein a second ribbon is mounted thereon.
Figure 7:
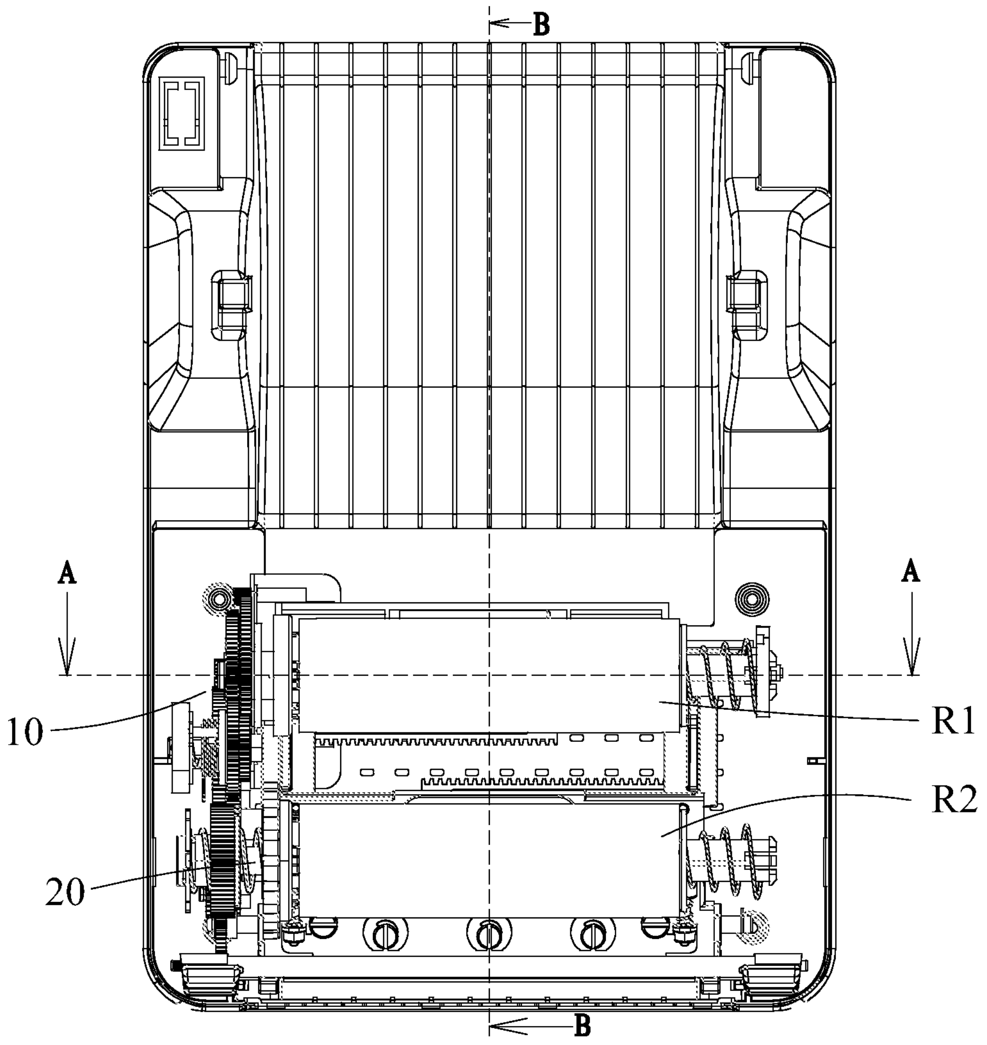
FIG. 7 is a top view of the printing device of FIG. 3.

As shown in FIGS. 5 and 6, the ribbon mounting mechanism 10 and the retrieving shaft 20 are provided for mounting a first ribbon RB1 and a second ribbon RB2 respectively. The first ribbon RB1 is a ribbon R mounted a first core H1, a paper tube of 0.5-inched diameter in this embodiment. The second ribbon RB2 is a ribbon R mounted a second core H2, a paper tube of 1.0-inched diameter in this embodiment.

Figure 8:
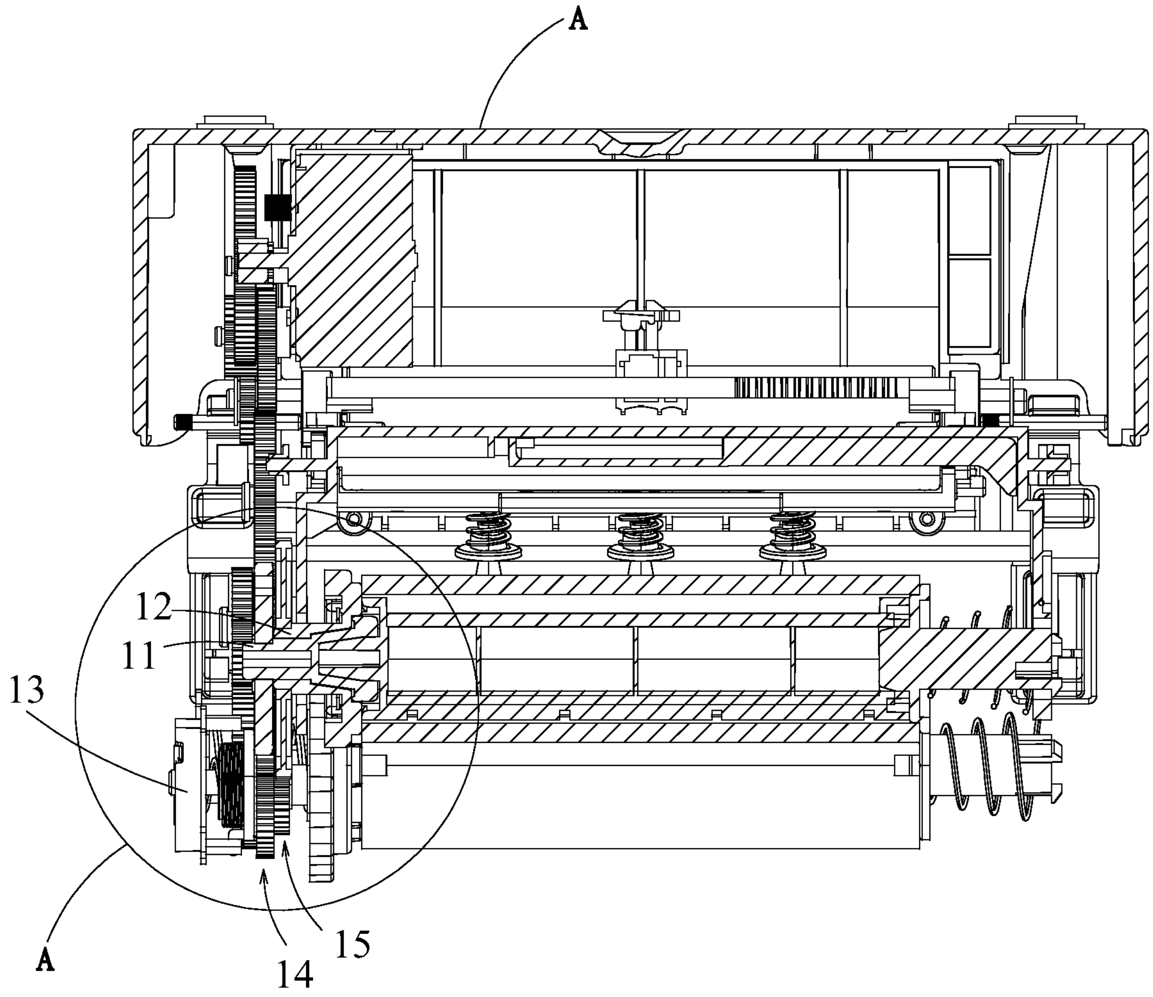
FIG. 8 is a cross section of FIG. 6 along a line A-A.
Figure 9:
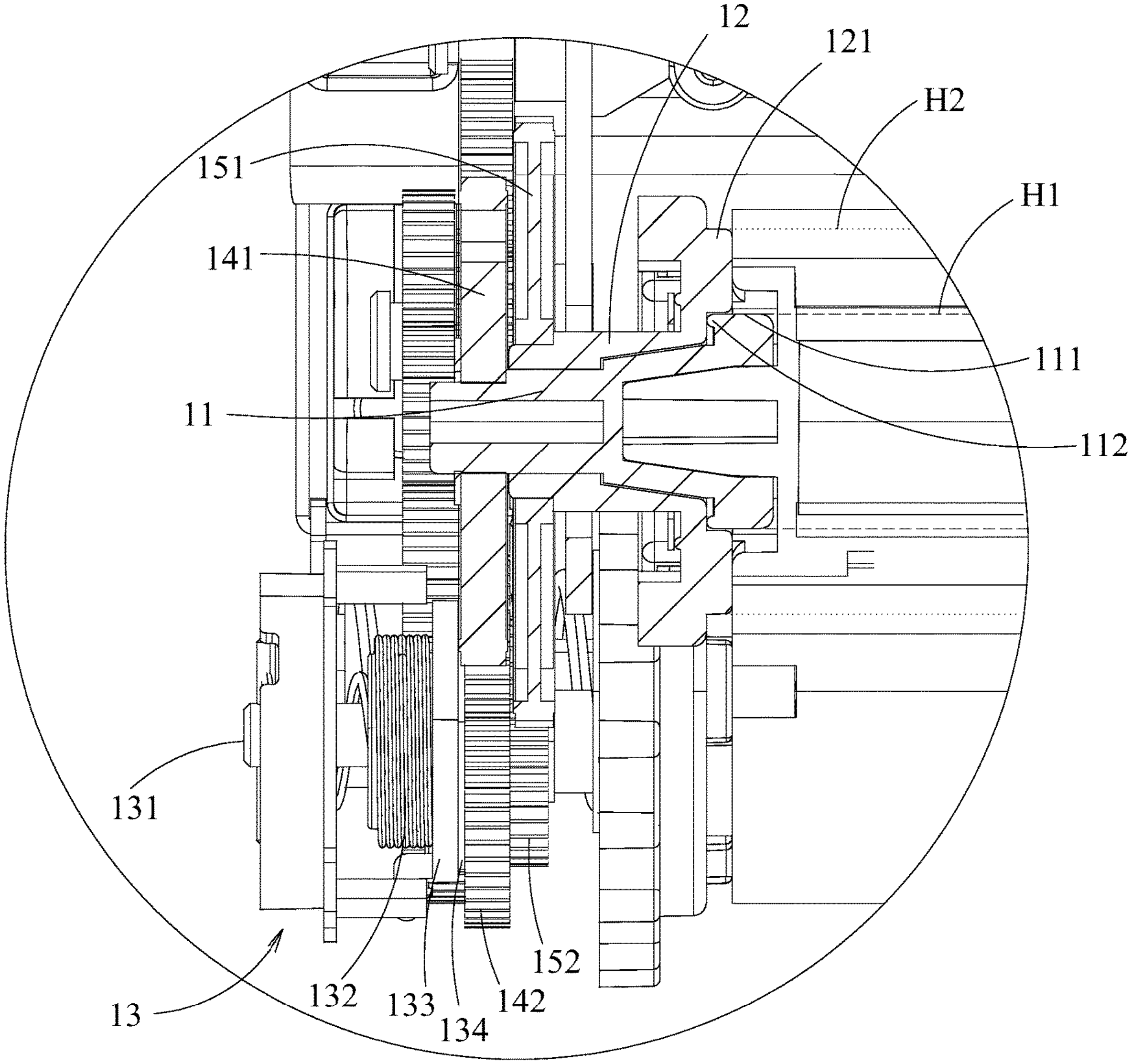
FIG. 9 is an enlarged view of a portion A of FIG. 7, wherein an embodiment of a ribbon mounting mechanism of the invention is presented.
Figure 10:
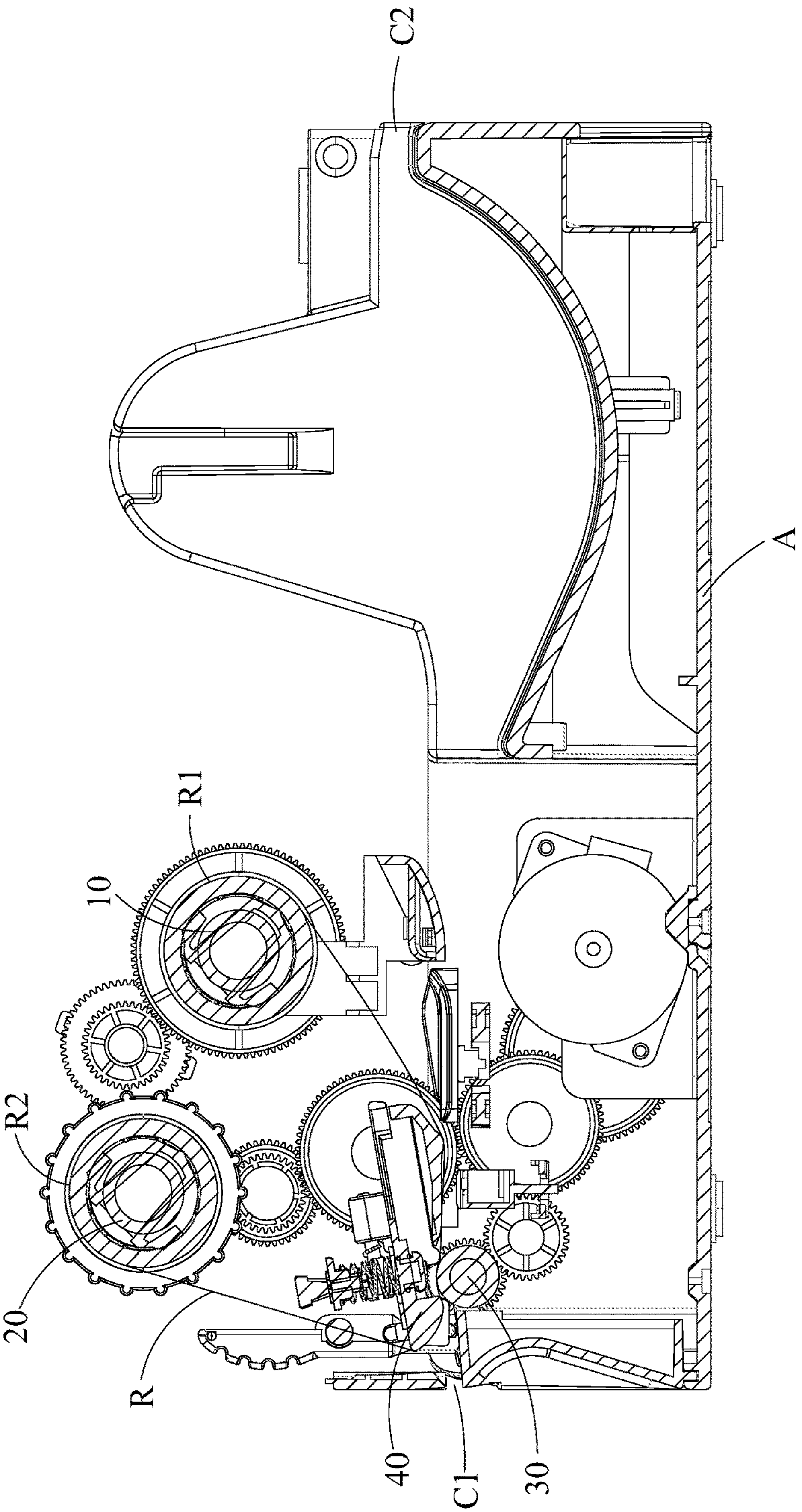
FIG. 10 is a cross section of FIG. 6 along a line B-B.
Figure 11:
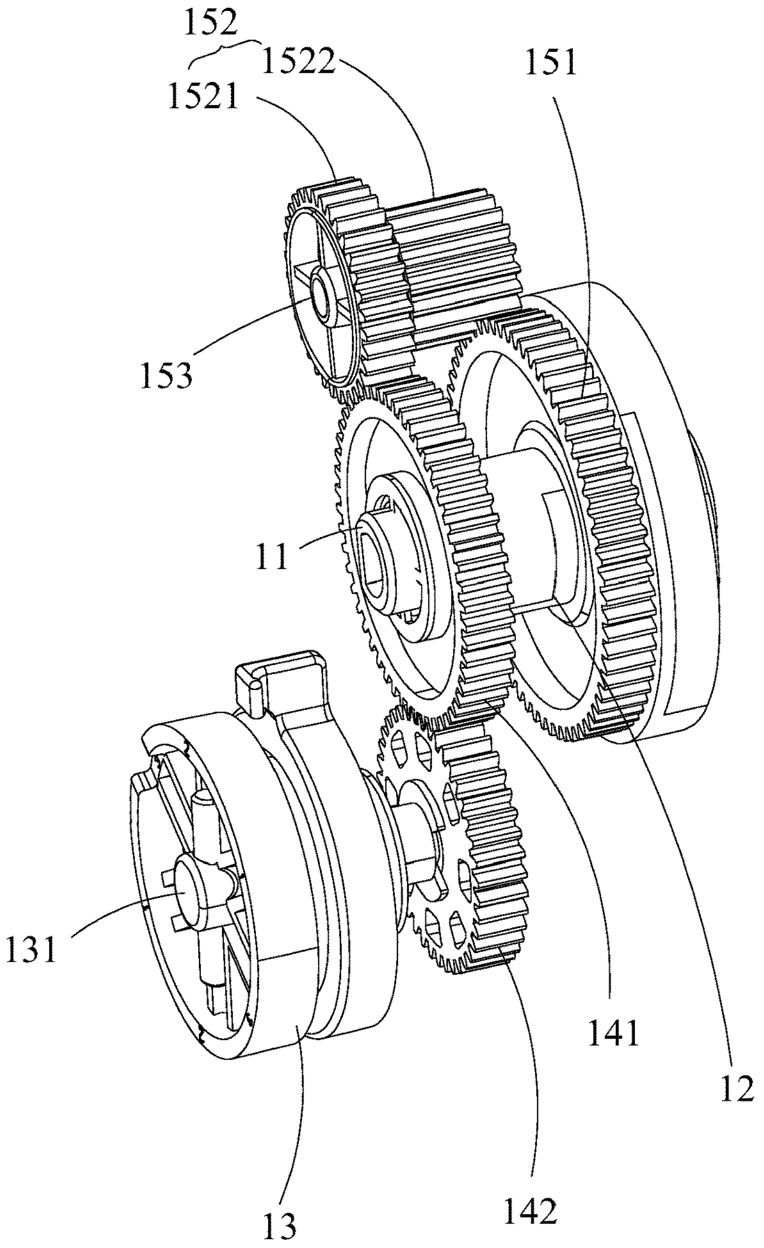
FIG. 11 is a perspective view of another embodiment of a ribbon mounting mechanism of the invention.
Figure 12:
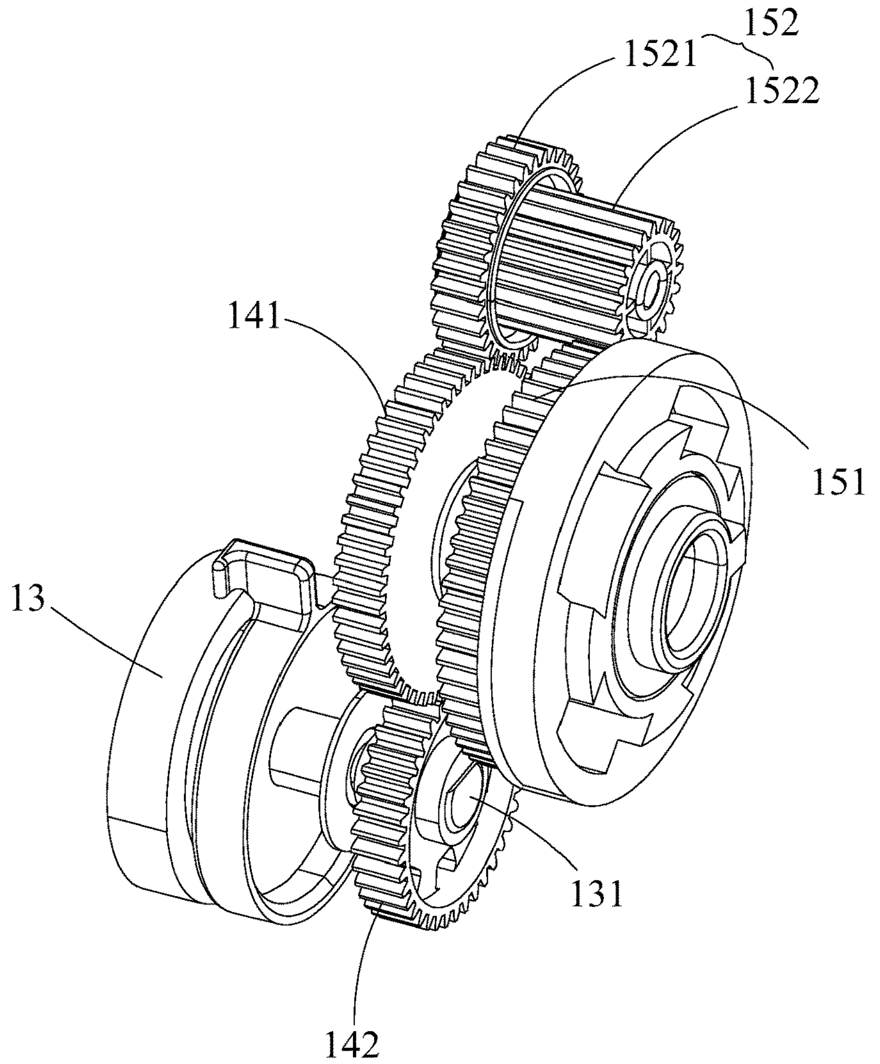
FIG. 12 is a perspective view of the ribbon mounting mechanism of FIG. 11 at another view angle.
Figure 13:
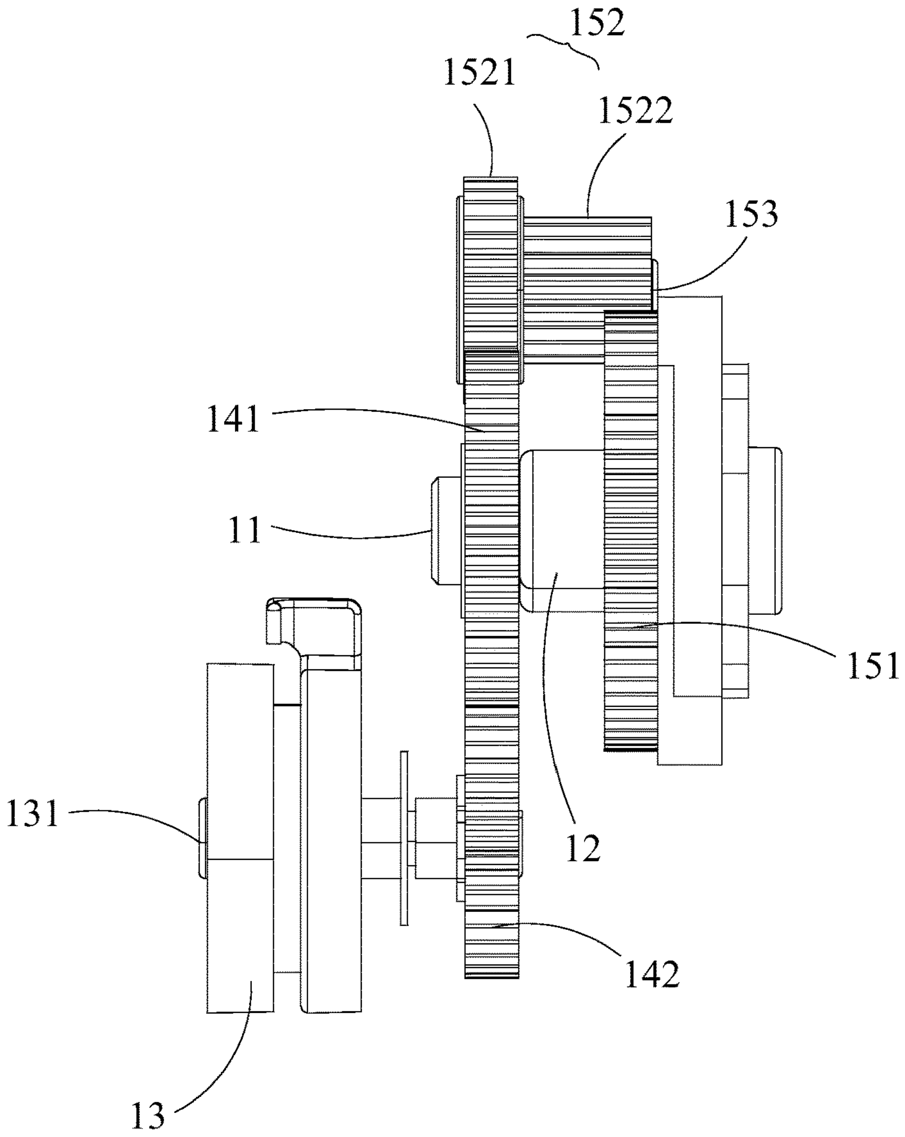
FIG. 13 is a front view of the ribbon mounting mechanism of FIG. 11.
Figure 14:
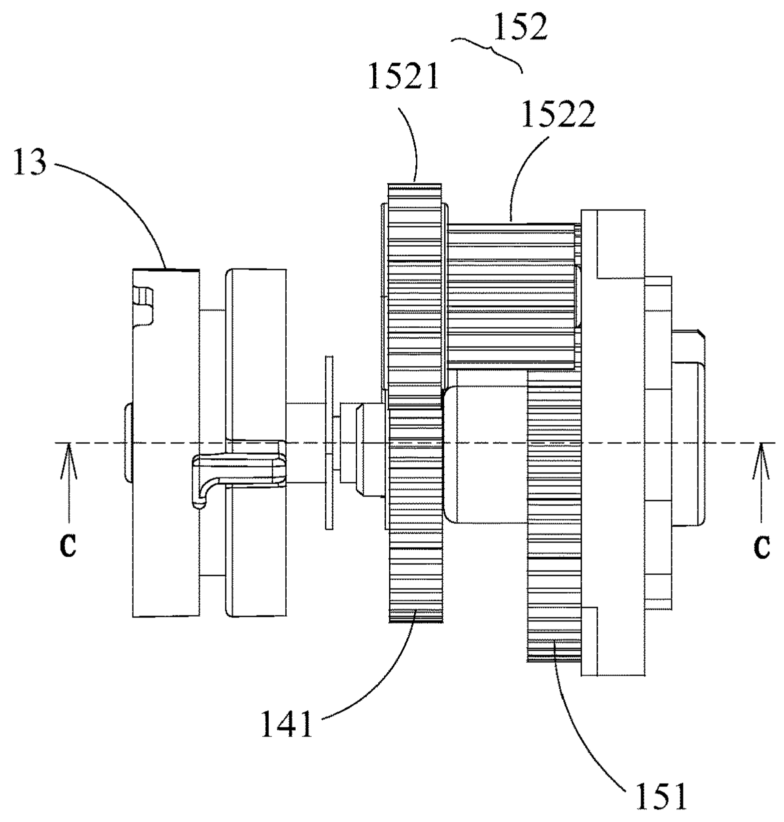
FIG. 14 is a top view of the ribbon mounting mechanism of FIG. 11.
Figure 15:
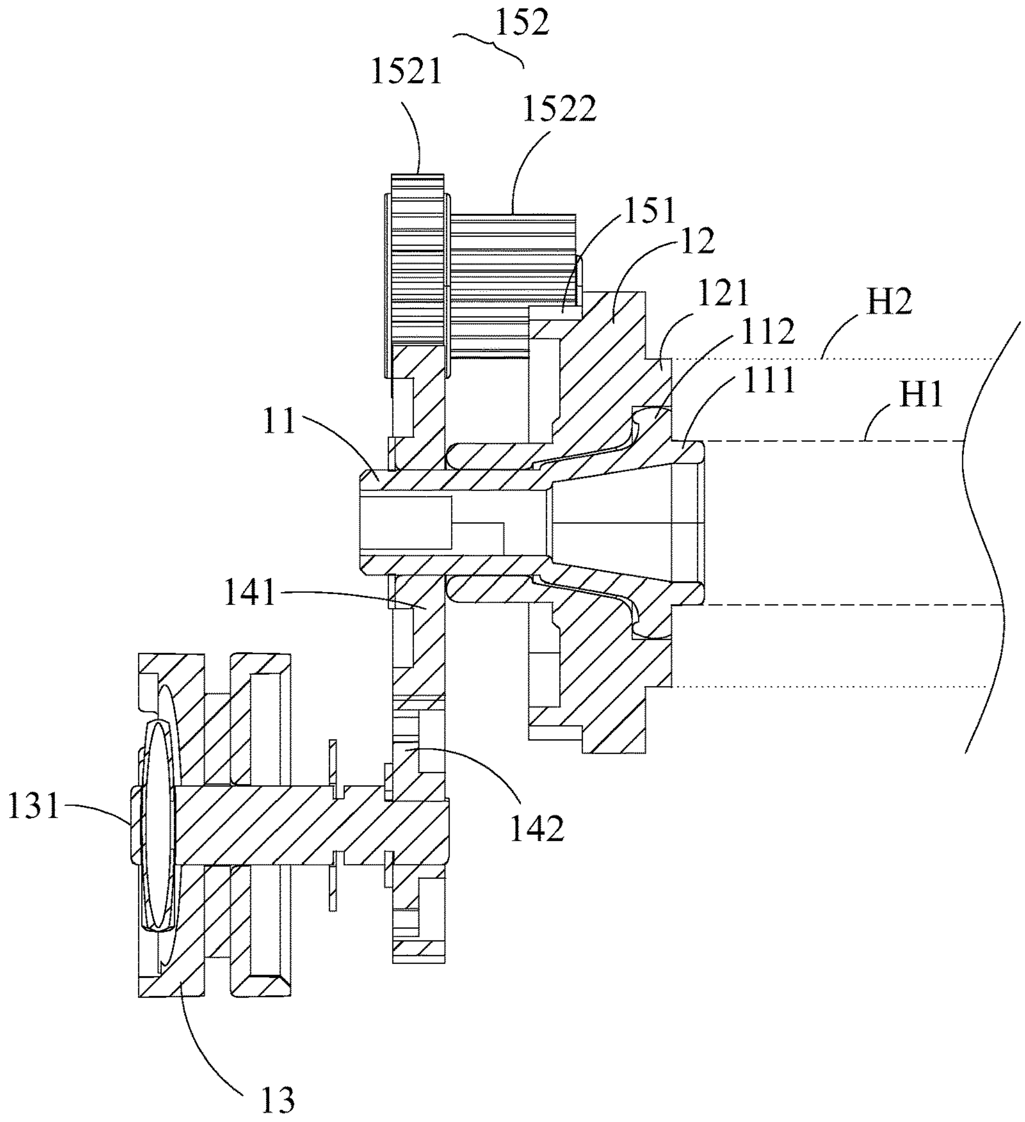
FIG. 15 is a cross section of FIG. 14 along a line C-C.

Referring to FIGS. 3, 7, 8 and 9, the ribbon mounting mechanism 10 includes a first shaft 11, a second shaft 12, a torque generator 13, a first gear set 14 and a second gear set 15. The first shaft 11 supports the first core H1 of the first ribbon RB1, and the second shaft 12 supports the second core H2 of the second ribbon RB2. The first shaft 11 and the second shaft 12 are concentrically disposed. As shown in FIGS. 8 and 9, the second shaft 12 are disposed on an outer peripheral surface of the first shaft 11, and the first shaft 11 and the second shaft 12 are rotated simultaneously.

The first shaft 11 has a first supporting portion 111, and the second shaft 12 has a second supporting portion 121. The second supporting portion 121 has a diameter greater than that of the first supporting portion 111. The first supporting portion 111 and the second supporting portion 121 are unaligned in the axial direction. The first shaft 111 has a bearing portion 112 disposed on an outer peripheral surface thereof, and the bearing portion 112 supports the second supporting portion 121. When the user intends to use the first ribbon RB1, the user mounts the first core H1 to the first supporting portion 111, whereby the first ribbon RB1 and the first shaft 11 rotate simultaneously. Similarly, when the user intends to use the second ribbon RB2, the user mounts the second core H2 to the second supporting portion 121, whereby the second ribbon RB2 and the second shaft 12 rotate simultaneously.

The torque generator 13 has a third shaft 131. The first gear set 14 connects the first shaft 11 and the third shaft 131. The torque generated by the torque generator 13 is transmitted from the first gear set 14 to the first shaft 11. The first gear set 14 includes a first gear 141 and a second gear 142. The first gear 141 is jointed to the first shaft 11 and rotated with the first shaft 11 simultaneously. The second gear 142 is joined to the third shaft 13 and rotated with the third shaft 13 simultaneously. The second gear 142 engages the first gear 141. In this embodiment, the first gear 141 has a diameter and a teeth number greater than that of the second gear 142. The present invention is not limited thereto. In other embodiments, the first gear 141 has a diameter and a teeth number smaller than that of the second gear 142.

When the tension roller 30 presses the ribbon R and drives the ribbon R to move from the ribbon supply roll R1 to the ribbon retrieve roll R2, the torque generator 13 generates torque transmitted to the second shaft 12 through the second gear set 15, whereby the ribbon R generates tension force.

In the present embodiment, the teeth ratio of the first gear set 14 is different from that of the second gear set 15, whereby the torque generated by the torque generator 13 is transmitted from the first gear set 14 to the first shaft 11 or from the second gear set 15 to the second shaft 12 to generate different tension force on the ribbon corresponding to the first ribbon RB1 and the second ribbon RB2.

The torque generator 13 includes an elastic member 132, a first pressing plate 133 and a second pressing plate 134. The second pressing plate 134 is rotated with the third shaft 131 simultaneously. The elastic member 132 presses the first pressing plate 133, whereby the first pressing plate 133 presses the second pressing plate 134. The elastic member 132 is a compression spring. Friction force is generated between the first pressing plate 133 and the second pressing plate 134, whereby a torque is generated on the third shaft 131.

The first shaft 11, the second shaft 12 and the third shaft 131 are mutually parallel. The first gear 141 and the second gear 142 of the first gear set 14 are spur gears, and the third gear 151 and the fourth gear 152 of the second gear set 15 are also spur gear. In other embodiments, the first shaft 11, the second shaft 12 and the third shaft 13 are mutually orthogonal. The first gear set 13 and the second gear 15 can be helical gear or bevel gear.

Referring to FIGS. 11, 12, 13, 14 and 15, another embodiment of the ribbon mounting mechanism is presented. The ribbon mounting mechanism of the present embodiment has a portion of structure identical to the ribbon mounting mechanism of the previous embodiment, and therefore the same elements are presented by the same numerical and the description is thus omitted. The second gear set 15 of the present embodiment includes a third gear 151 integrated with the second shaft 12, a fourth shaft 153 and a fourth gear 152. The third gear 151 is constituted by a plurality of teeth formed on an outer peripheral surface of the second shaft 12. The fourth gear 152 is joined to the fourth shaft 153 and rotated with the fourth shaft 153 simultaneously. The fourth gear 152 meshes the first gear 141 and the third gear 151. The third gear 151 has a diameter and teeth number greater than that of the first gear 141. The second gear 142 has a diameter and teeth number greater than that of the fourth gear 152.

The fourth gear 152 includes a first teeth portion 1521 and a second teeth portion 1522. The first teeth portion 1521 meshes the first gear 131, and the second teeth portion 1522 meshes the third gear 151.

The gear ratio of the first gear set 14 is different from that of the second gear set 15. The torque generated by the torque generator 13 is transmitted to the first shaft 11 through the first gear set 14 or transmitted to the second shaft 12 through the second gear set 15 to generate different tension forces on the ribbon R corresponding to the first ribbon RB1 or the second ribbon RB2.

The ribbon mounting mechanism of the present invention is provided with the first shaft and the second shaft for mounting the first ribbon with the first core and the second ribbon with the second core respectively. The torque generated by the torque generator is transmitted to the first shaft through the first gear set or transmitted to the second shaft through the second gear set, thereby generating different tension force on the first ribbon and the second ribbon. The different tension forces on the first ribbon and the second ribbon are caused by the different gear ration of the first gear set and the second gear set. The user may mount the first ribbon or the second ribbon of different sized cores onto the ribbon mounting mechanism. The torque generator changes the torque through the first gear set and the second gear set having different gear ratio. Therefore, the printing device of the present invention may directly use the first ribbon and the second ribbon with manual adjustment of the tension force.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A ribbon mounting mechanism for mounting a first ribbon comprising a first core and a second ribbon comprising a second core having a diameter smaller than that of the first core, comprising:

a first shaft supporting the first core of the first ribbon;

a second shaft supporting the second core of the second ribbon, wherein the second shaft and the first shaft are concentrically disposed;

a torque generator comprising a third shaft;

a first gear set connecting the first shaft and the third shaft, and torque generated by the torque generator is transmitted to the first shaft through the first gear set; and a second gear set connecting the second shaft and the third shaft, and torque generated by the torque generator is transmitted to the second shaft through the second gear set.

2. The ribbon mounting mechanism as claimed in claim 1, wherein the first gear set comprises:

a first gear joined to the first shaft; and a second gear joined to the third shaft and engaging the first gear.

3. The ribbon mounting mechanism as claimed in claim 2, wherein the second gear set comprises:

a third gear joined to the second shaft; and a fourth gear joined to the third shaft and engaging the third gear;

wherein the third gear has a diameter and teeth number greater than that of the first gear;

wherein the second gear has a diameter and teeth number greater than that of the fourth gear.

4. The ribbon mounting mechanism as claimed in claim 2, wherein the second gear set comprises:

a third gear integrated to the second shaft; and a fourth shaft;

a fourth gear joined to the fourth shaft and engaging the first gear and the third gear;

wherein the third gear has a diameter and teeth number greater than that of the fourth gear;

wherein the third gear has a diameter and teeth number greater than that of the first gear;

wherein the second gear has a diameter and teeth number greater than that of the fourth gear.

5. The ribbon mounting mechanism as claimed in claim 1, wherein the fourth gear comprises a first teeth portion engaging the first gear and a second portion engaging the third gear, the first gear portion has a diameter and teeth number greater than that of the second gear portion.

6. The ribbon mounting mechanism as claimed in claim 1, wherein the first shaft, the second shaft and the third shaft are parallel.

7. The ribbon mounting mechanism as claimed in claim 1, wherein the torque generator comprises an elastic member, a first pressing plate and a second pressing plate, the second pressing plate and the third shaft are rotated simultaneously, the elastic member props against the first pressing plate, whereby the first pressing plate presses the second pressing plate.

8. The ribbon mounting mechanism as claimed in claim 1, wherein the second shaft surrounds an outer periphery surface, the first shaft has a first supporting portion, the second shaft has a second supporting portion having a diameter greater than that of the first supporting portion, and the first supporting portion and the second support portion are unaligned.

9. The ribbon mounting mechanism as claimed in claim 8, wherein the first shaft has a support portion disposed on the outer periphery surface thereof, and the support portion supports the second support portion.

10. A printing device, comprising:

a ribbon mounting mechanism as claimed in claim 1 on which a ribbon supply roll is mounted;

a retrieving shaft on which a retrieving ribbon roll is mounted;

a tension roller pressing on a ribbon to generate a tension force on the ribbon, whereby the ribbon is driven from the supply ribbon roll to the retrieving ribbon roll; and a printing head enabling carbon material of the ribbon onto a printing medium.

* * * * *